United States Patent [19]

Stuart et al.

[11] Patent Number: 5,099,158

[45] Date of Patent: Mar. 24, 1992

[54] ELECTROMAGNETIC ACTUATOR

[75] Inventors: Keith O. Stuart, Cypress; Bradley J. Ashbrook; Dennis C. Bulgatz, both of Los Angeles, all of Calif.

[73] Assignee: Aura Systems, Inc., El Segundo, Calif.

[21] Appl. No.: 499,046

[22] Filed: Mar. 26, 1990

Related U.S. Application Data

[63] Continuation-in-part of Ser. No. 319,956, Mar. 7, 1989, Pat. No. 4,912,343, which is a continuation-in-part of Ser. No. 238,925, Aug. 31, 1988, abandoned.

[51] Int. Cl.$^5$ .................. H02K 41/00; H02K 33/18
[52] U.S. Cl. .................................. 310/14; 310/30
[58] Field of Search ............... 310/12, 14, 30, 34, 310/35; 355/266, 267

[56] References Cited

U.S. PATENT DOCUMENTS

| | | | |
|---|---|---|---|
| 4,434,968 | 3/1984 | Smith | 254/1 |
| 4,912,343 | 3/1990 | Stuart | 310/14 |

FOREIGN PATENT DOCUMENTS

| | | | |
|---|---|---|---|
| 1015911 | 9/1957 | Fed. Rep. of Germany | 310/154 |
| 2375748 | 8/1978 | France | 310/154 |
| 0083006 | 7/1978 | Japan | 310/154 |

Primary Examiner—Steven L. Stephan
Assistant Examiner—Judson H. Jones
Attorney, Agent, or Firm—Anthony T. Cascio

[57] ABSTRACT

An improved electromagnetic actuator of the type comprising (a) a first assembly; (b) a second assembly movable relative to the first assembly along an axis of relative movement in response to a command signal, the second assembly comprising magnetic flux source means for defining radially directed flux both in an inward and outward direction relative to the axis of relative movement; (c) coil assembly means for defining at least two coil segments respectively disposed in the paths of the flux in the inward and outward directions; and (d) means for applying the command signal to the coil segments so that a current flows in one direction around the axis through the inward directed flux, and flows in the opposite direction around the axis through the outward directed flux so that the flux/current force applied between the first and second assemblies is additive. In accordance with one aspect of the invention flat magnets and flux focussing elements are used to provide the radially directed flux. In accordance with another aspect the coil sections are wound onto a core element to provide an attached coil design. Finally, a brushless actuator design is disclosed.

11 Claims, 6 Drawing Sheets

ELECTROMAGNETIC ACTUATOR

The present application is a continuation-in-part of co-pending U.S. Pat. application No. 07/319956 filed on Mar. 7, 1989 in the name of Keith O. Stuart, now U.S. Pat. No. 4,912,343 issued Mar. 27, 1990 (the "'343 Patent"); which in turn is a continuation-in-part of U.S. Pat. application No. 07/238,925 filed Aug. 31, 1988, now abandoned.

The present invention relates generally to electromagnetic actuator systems, and more particularly to an improved electromagnetic actuator system capable of providing relatively large output forces in response to relatively low level electrical input signals.

Electromagnetic actuators are well known. In many applications the output force of the actuator is controlled by and a function of an electrical control or command signal, and as such can be used in a variety of applications. Such actuators include linear actuators as well as angular actuators, and can be used in numerous applications. For example, as described in U.S. Pat. No. 4,892,328 issued Jan. 9, 1990 and assigned to the present assignee (hereinafter the '328 Patent), a linear actuator is employed as part of an electromagnetic strut assembly in an active suspension system for controlling the level and orientation of a chassis of a motor vehicle relative to the vehicle frame.

An improved actuator is described in the '343 Patent. The actuator, which can be linear or angular, is capable of providing relatively large output forces in response to relatively small level command signals. The patented system comprises first and second cylindrical assemblies coaxially mounted and movable relative to one another along a common axis. The actuator comprises means for defining radially directed flux in an inward radial direction along at least one axial section of the assemblies, and in an outward radial direction along at least one other axial section of the assemblies. A coil assembly comprises at least two cylindrical coil segments coaxial with the common axis, with one coil segment disposed in each of the flux paths. Means are provided for applying the control signal to the coil segments so that current flows in one direction around the common axis through those coil segments disposed in the inwardly radially directed flux, and flows in the opposite direction around the common axis through those coil segments disposed in the outwardly directed flux so that the flux/current force created in accordance with Lenz's Law and applied between the first and second assemblies is additive.

The preferred embodiment described in the '343 Patent employs three coils disposed coaxially about the axis of relative movement. At least a pair of axialy spaced apart, cylindrical magnets, each radially polarized so that flux is directed in radial directions from the magnet, are positioned between the inner and intermediate coils. At least a second pair of similar magnets are positioned between the intermediate and outer coils. The magnets are preferably made of a high magnetic energy product material producing a relatively high flux density, such as for example, neodymium-iron-boron or samarium-cobalt. The magnets are polarized so that one of the magnets of each set provides flux in a radially inward direction, while the other magnet of each set provides flux in a radial outward direction. The magnets providing the inwardly directed flux are axialy aligned, as are the magnets providing the outwardly directed flux so that the magnets of each polarity orientation provide all of the radial flux through the same sections of the coil assembly. A center core member positioned in the inner coil, and a cylindrical tube positioned around the outer coil, both coaxial with the axis of relative movement, provide a return path for the flux of the magnets.

Brushes are provided between the sets of magnets and at the opposite ends of the magnets for applying control current in the coils in one direction through the inwardly directed flux, and in the other direction through the outwardly directed flux so that the current/flux force created in accordance with Lenz's Law will be additive. In the embodiment shown in the '343 Patent, the magnets, core element and outer cylinder all move relative to the coils in response to the force provided.

While the design shown in the '343 Patent provides relatively high output forces in response to relatively low level command signals, present costs of producing cylindrical magnets of the type shown and described in the '343 Patent, particularly relatively large magnets (e.g., four to six inches in diameter) are high in comparison to the overall cost of the actuator design shown. Further, magnets made of high magnetic energy product material such as neodymium-iron-boron or samarium-cobalt tend to be sensitive to environmental conditions and can physically deteriorate when subjected to adverse environmental conditions. Further, in the design shown in the '343 Patent the coil assemblies must be sufficiently structurally rigid to withstand the forces applied between the two assemblies. In some applications, such as the strut assembly shown in the '328 Patent, it may be difficult to dampen natural frequencies in the strut system due to variable conditions to which the assembly might be exposed. Finally, brushes tend to wear so that, at least in certain applications, the actuator design shown in the '343 Patent may prove to be unsatisfactory where very long term operation and low maintenance is desired.

Accordingly, it is an object of the present invention to provide an improved electromagnetic actuator which overcomes or substantially reduces the above-noted problems.

Another object of the present invention is to simplify the design of the electromagnetic actuator shown and described in the '343 Patent.

And another object of the present invention is to provide an electromagnetic actuator of the type described in the '343 Patent and adapted to use readily available flat magnets so as to reduce the overall cost of the actuator.

Yet another object of the present invention is to provide an improved electromagnetic actuator using the principles of the actuator design of the '343 Patent, while providing a protected environment for magnets of high permeability material so as to improve the life of the magnets.

Still another object of the present invention is to provide three alternative designs of the electromagnetic actuator, each for different applications.

And yet another object of the present invention is to provide an improved brushless version of the electromagnetic actuator of the type described in the '343 Patent and those described herein.

These and other objects of the present invention are achieved by an improved electromagnetic actuator of the type comprising (a) a first assembly; (b) a second assembly movable relative to the first assembly along an axis of relative movement in response to a command signal, the second assembly comprising magnetic flux source means for defining radially directed flux both in an inward and outward direction relative to the axis of relative movement; (c) coil assembly means for defining at least two coil segments respectively disposed in the paths of the flux in the inward and outward directions; and (d) means for applying the command signal to the coil segments so that a current flows in one direction around the axis through the inward directed flux, and flows in the opposite direction around the axis through the outward directed flux so that the flux/current force applied between the first and second assemblies is additive. In accordance with one aspect of the invention flat magnets and flux focussing elements are used to provide the radially directed flux. In accordance with another aspect the coil sections are wound onto a core element to provide an attached coil design. Finally, a brushless actuator design is disclosed.

Other objects of the invention will in part be obvious and will in part appear hereinafter. The invention accordingly comprises the product possessing the features, properties and relation of components which are exemplified in the following detailed disclosure, and the scope of the application of which will be indicated in the claims.

For a fuller understanding of the nature and objects of the present invention, reference should be had to the following detailed description taken in connection the accompanying drawings wherein:

FIG. 1 a cross-sectional view taken along the axis of relative movement of one embodiment of the linear actuator of the present invention;

FIG. 2 a cross-sectional view taken along line 2—2 in FIG. 1;

In the drawings the same numerals are used to refer to identical or similar parts.

Figure 1:
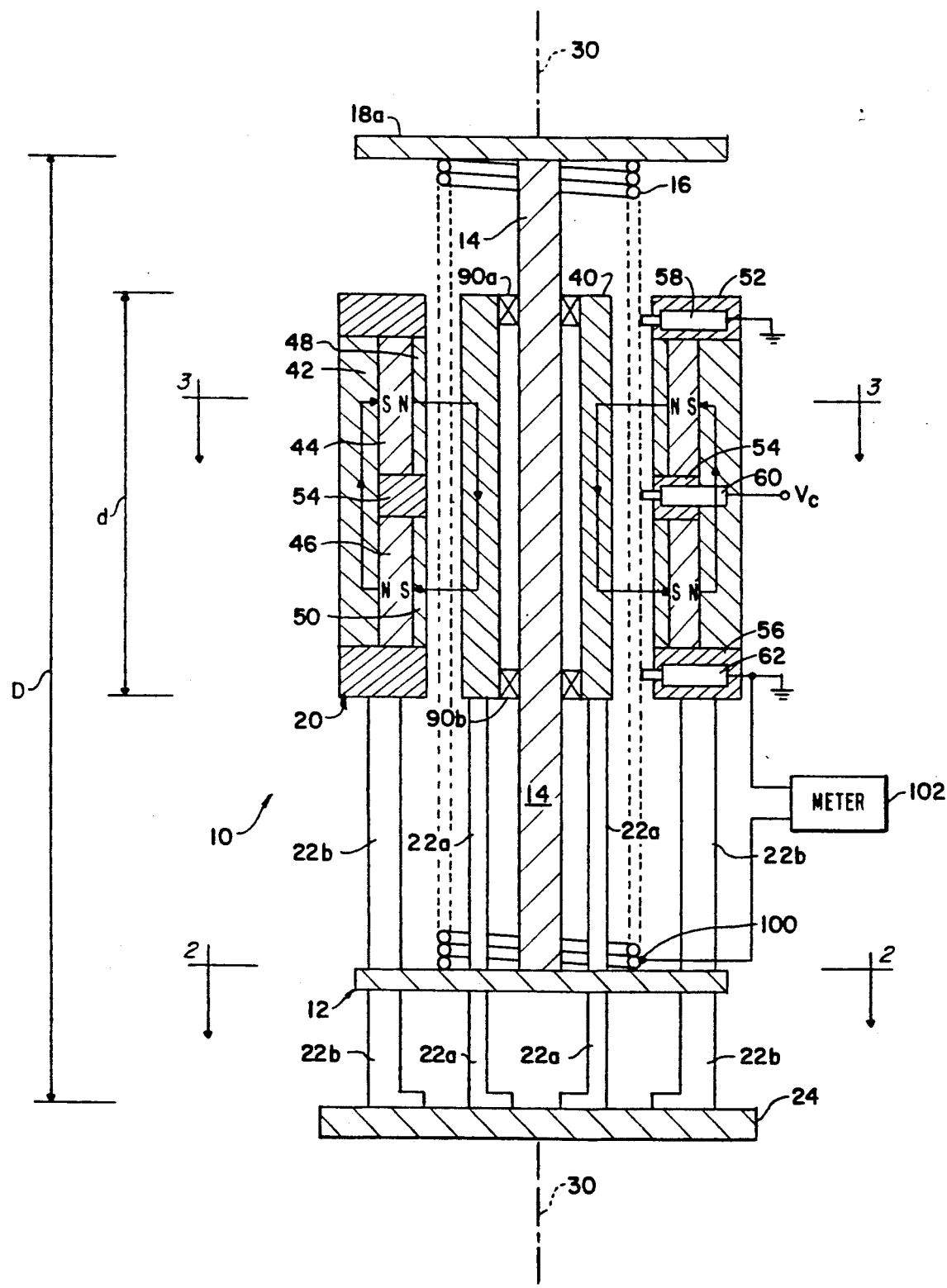

Referring to FIG. 1, the actuator shown is of a "free coil" design, and a simplification and improvement of the design specifically shown in the '343 Patent, wherein the coil is moved as part of one assembly relative to the elements forming the magnetic circuit as part of a second assembly. More specifically, the actuator, indicated generally at 10, includes a first assembly 12 comprising center support shaft 14 and coil assembly 16, each secured between opposite end supports 18, and a second assembly 20 including the components defining the magnetic circuit, for providing the radially directed flux, secured to the inner and outer support pedestals 22a and 22b, which in turn are supported by the base plate 24. The first and second assemblies are cooperative so as to define an axis of relative movement 30 so that the second assembly 20 slides relative to the first assembly 12 along the axis 30. As will be seen in greater detail hereinafter, the two assemblies are movable relative to one another along the axis 30 in response to and as a function of a command signal applied to the actuator.

Described in greater detail, the first assembly 12 includes center shaft 14 which is coaxially positioned with axis 20. Center shaft 14 is fixed to the end supports 18a and 18b in any suitable manner so that the shaft and supports move with one another. The center shaft 14 and plates 18a and 18b are preferably made of a magnetically non-conductive material, such as aluminum. Coil assembly 16 includes electrically conductive wire wound into a cylindrical tubular or thin walled cylindrical shape and suspended from and secured to the supports 18 at the top and bottom of the assembly by any suitable means. The coil assembly 16 is shown as including one layer of coiled wire. The coil wire is preferably is preferably of a rectangular cross-section and "edge wound" so that the length of the wire is radially directed, and the width of the wire axialy directed. The ratio of the length to width of the rectangular wire defines the number of turns of wire disposed in each magnetic field as will be more apparent hereinafter. The coil assembly 16 is suspended so that it remains coaxial about axis 30 as the two assemblies move relative to one another. The coil is made from electrically-conductive wire coated with an electrically insulating material, with a portion of the wire physically exposed along the outside of the assembly, along an axial line so that the brushes 58, 60 and 62 can electrically engage the exposed wire as the brushes move relative to the coil assembly, as described in greater detail hereinafter. The coils are preferably bonded so as to be sufficiently stiff by themselves, but may be wound on a suitably stiff member such as a graphite composite, in order to insure their structural rigidity during use. The coils of assembly 16 are uniformly wound, with the same size wire, in the axial direction so as to contain the same number of turns, i.e., the same length of wire, per unit length of the assembly along the axis 30.

Figure 2:
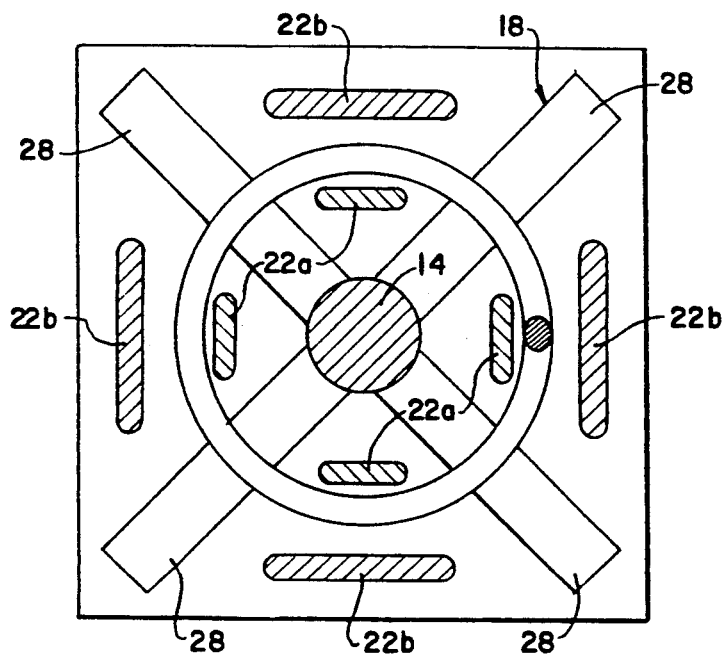

As shown in FIG. 2, the end supports 18 are formed so as allow axial movement of the supports relative to the pedestals 22a and 22b. For example, as shown, the end supports can be made with a radial cross-section in the form of an X so as to have radial extending arms 28, with the pedestals 22a and 22b being formed of elongated elements or rods radially spaced from, and equiangularly spaced around the axis 30 between the arms 28. This will allow free relative axial movement between the two assemblies, while maintaining the parts radially fixed.

The second assembly 20 generally includes means for forming the magnetic circuit, as well as the means for applying the command signals to the portions of coil assembly 16 disposed within the magnetic flux created by the magnetic circuit. More specifically, the second assembly 20 includes a center core member 40, outer cylindrical case 42, magnet assemblies 44 and 46, the flux focusing pole pieces 48 and 50, the brush holder rings 52, 54 and 56 and the brushes 58, 60 and 62.

More specifically, the second assembly 20 includes the hollow center core member 40. Core member 40 is mounted on the inner pedestal 22a coaxial with and disposed around the shaft 14 and within the coil assembly 16. The core member is fixed against radial movement relative to the axis 30. Core member 40 is made of a magnetically conductive material, such as soft iron or vanadium permandur. Core member 40 can be made of a solid material, or of radial or semi-radial laminations.

Figure 3:
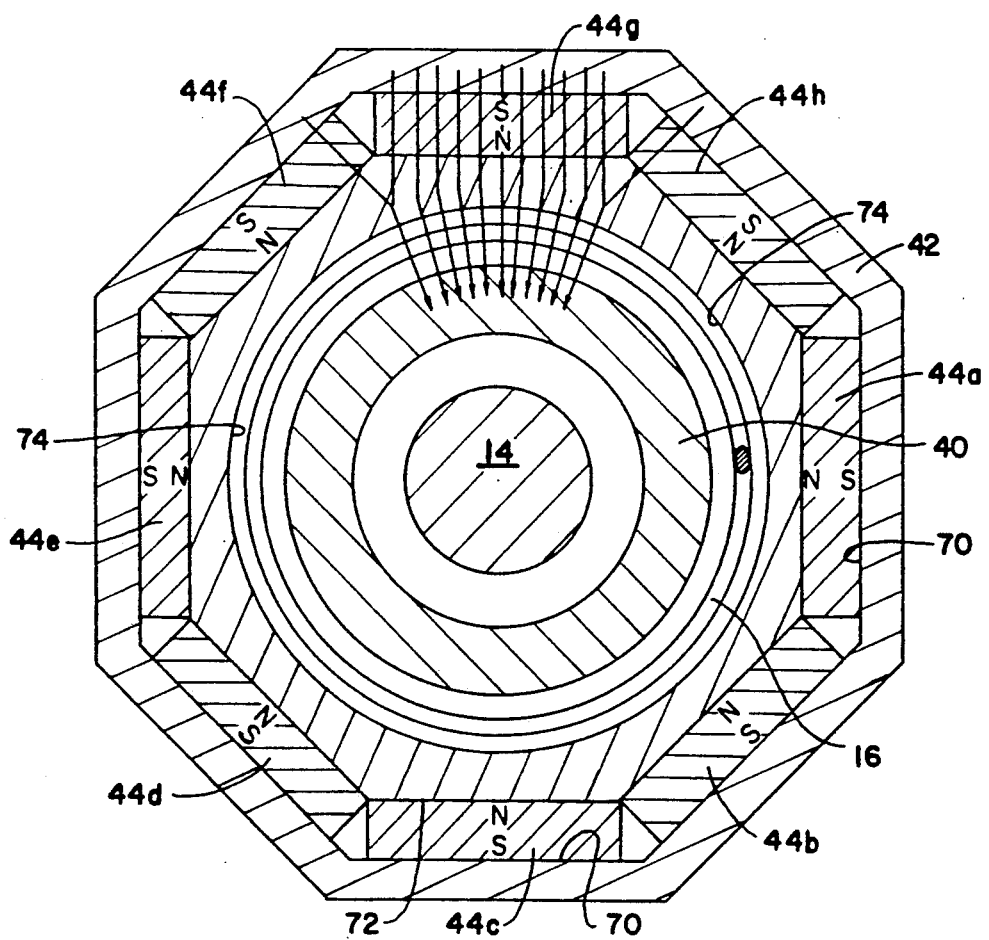
FIG. 3 is a cross-sectional view taken along line 3—3 of FIG. 1.

The outer cylindrical case 42 is also made of a magnetically conductive material, such as soft iron or vanadium permandur. The core element is shaped and has a radial thickness sufficiently thick to avoid flux saturation and minimize reluctance, as will be more apparent hereinafter. The case 42 has inner surfaces shaped to mate with the outer surfaces of the magnets 44 and 46 and the center brush holder ring 60. In this regard the inner surfaces of the outer cylindrical case 42 includes flat surfaces 70, as best shown in FIG. 3, so that the magnets 44 and 46 can be bonded to the surfaces 70, with a suitable epoxy in their correct axial and radial positions relative to the remaining parts of assembly 20, as described hereinafter. The magnets are secured to surfaces 70 so that no air gaps exist there between so as to insure good magnetic conduction between the magnets and the outer cylindrical case. Similarly, the the inner surfaces of the outer cylindrical case 42 receiving the brush holder ring 54 is shaped so that the ring can be cemented to the inner surface of the case 42 so that the brush ring also is secured in place.

The design shown in the '343 Patent utilizes cylindrical magnets polarized in a radial direction for providing radially directed flux. However, such magnets are costly to manufacture, particularly larger sized magnets (in the order of 4 to 6 inches in radius), and are fragile, particularly when exposed to harsh environmental conditions. Accordingly, in accordance with one aspect of the present invention, flat magnets replace the cylindrical magnets, and means, in the form of cylindrical flux focusing pole pieces 48 and 50, are employed for focusing the flux provided by the magnets substantially in a radial direction through the coil assembly.

The magnets 44 and 46 are made of a permanently magnetized material, such as neodymium-iron-boron or samarium-cobalt, for providing flux of substantially uniform density in inwardly and outwardly radial directions respectively through two different axial sections of the coil assembly 16 at any one position of the first assembly relative to the second assembly. More particularly, all of the magnets are preferably identical in size, with the polarization of each oriented so that the flux is directed through the thickness of each magnet, in a normal direction to the large flat sides. Magnets 44 are positioned so that the north and south poles are all oriented so that flux is directed in one radial direction (shown as inwardly directed), while the magnets 46 are positioned so that the poles are all oriented so that flux is directed in the opposite radial direction to that of magnets 44 (shown as outwardly directed).

As best shown in FIG. 3, the magnets of each set are equiangularly spaced around and equidistantly spaced from the axis 30. The magnets of each set are positioned as closely as possible to one another so that there is a minimum gap between adjacent magnets within each set. All of the magnets of each set are positioned at the same axial position so that the magnets approximate a right cylinder ring of a polygonal cross-section when secured to the respective surfaces 70 of the outer cylindrical case 42. The number of magnets per set can vary, depending upon the size of the actuator desired. However, as will be more apparent hereinafter, the greater the number, the more closely the cylindrical magnet of a circular cross section is approximated, with a corresponding decrease of flux leakage. However, the greater the number of magnets per set, the more parts are required to construct the actuator, with an increase in cost and complexity of manufacturing the same.

Means for focusing the flux created by each set of magnets 44 and 46 includes flux focusing pole pieces 48 and 50, respectively. Each of the cylindrical pole pieces 48 and 50 are made of a tube of magnetically-conductive material, such as soft iron. Each element 44 and 46 has a plurality of outer flat surfaces, indicated as surfaces 72 in FIG. 3 (one for each magnet of each set), so as to form an outer cross-section polygonal shape so that the inner flat surface of each magnet of each set can be bonded to each outer flat surface. Again a suitable cement is used. The cement is applied between each set of magnets and the corresponding focusing pole piece so that minimum practical air gaps exist between each magnet and corresponding surface 72. Since the magnets of each set are oriented in the same way, the focusing pole pieces can be shaped to direct the inwardly parallel directed magnetic flux from the flat magnets into the required inward radial direction. Accordingly, the inner surface 74 of each focusing pole piece 48 and 50 is curved so as to form an inner cross-sectional circular shape. Each focusing pole piece is secured so that the inner surface 74 is coaxial with the axis 30 and equidistantly spaced from the coil assembly 16, as well as the outer surface of the inner core member 40. The radial thickness of each focusing pole piece is made thick enough so as to sufficiently protect the magnets and uniformly distribute the flux in a radial manner. In this manner the magnets 44 and 46 and focusing pole pieces 48 and 50 approximate the magnetic field created by the tubular magnets of the design shown in the '343 Patent.

Thus, as shown in FIGS. 1 and 3, the flux created by the magnets 44 and 46 will pass substantially radially through the coil assembly 16, with the flux from magnets 44 being shown as passing through coil assembly 16 in an inward radial direction and the flux from magnets 46 being shown as passing through coil assembly 16 in an outward radial direction. A return path for the flux is provided down the inner core member 40, and up the outer cylindrical case 42.

In addition, as shown in FIG. 1, the outer case 42 also supports end brush holder rings 52 and 56 axialy positioned at opposite ends of the magnets. A third brush holder ring 54 is positioned between the two sets of magnets. The brush holder rings 52, 54 and 56 are made of a non-ferrous magnetically non-conductive material, such as aluminum or plastic, so as to insure the desired flux path produced by magnets 44 and 46. By surrounding the faces of each of the magnets 44 and 46 between the inner core member 40 and the outer cylindrical case 42, and the edges of the magnets between either brush holder ring 58 or 62 and brush holder 60, a protected environment is provided for each magnet.

The second assembly 20 is secured so that the two assemblies 12 and 20 easily slide relative to one another along the axis 30 of relative movement. In this regard, as shown in FIG. 1, at least two linear bearing assemblies 90a and 90b can be provided, between support shaft 14 and the core member 40 to facilitate the relative axial movement of the two assemblies.

The structure for applying the control signal to control the relative positions of the first and second assemblies, and resulting electromagnetic circuits, can be seen from FIG. 1. More particularly, the axial length of the inner core member 40, outer cylindrical case 42, magnets 44 and 46, and focusing pole pieces 48 and 50 can be divided into two sections or areas of high flux density, separated by the brush holder ring 54, where flux respectively is directed inwardly or outwardly. These sections move relative to coil assembly 16 with the relative movement of the first and second assemblies. Thus, as shown, two sections of high flux density are provided at two different axial positions, one corresponding to each set of magnets.

A primary control contact brush 60, secured in the holder ring 54, makes point contact with the coil assembly 16 between the two sections of high flux density. A pair of grounded contact brushes 58 and 62 are secured in the holder rings 52 and 56, respectively on opposite sides of the sets of magnets, and make point contact with the coil assembly at opposite ends of the two sections of high flux density. The brushes 58 and 62 are spaced the same amount of distance from the brush 60 so that an equal length of coil wire is provided between brushes 58 and 60 as between brushes 60 and 62. Each of the brushes are made of an electrically conductive material, such as a copper/graphite compound. The primary control brush is suitably connected to receive the command signal $V_c$, while the grounded contact brushes are suitably connected to system ground. As a result, when a control signal is applied to the contact brush 60, current flows to the two grounded brushes 58 and 62 in opposite axial directions. Since the flux transmitted through these two sections are opposite to one another, the forces generated along the axis 30, in accordance with Lenz's Law will be additive and will result in a net axial force between the first and second assemblies. The direction and level of the relative force will depend upon the polarity and amplitude of $V_c$, and thus the direction of the currents between brushes 58 and 60, and brushes 60 and 62. The brushes will remain in contact with the coil assembly regardless of the axial position of the first assembly within the relative to the second assembly.

In addition to the above, the actuator can also include means for measuring the relative displacement of the first and second assemblies 12 and 20. More specifically, an ohm meter can be applied between a fixed point of the coil assembly, preferably at one end indicated at 100 in FIG. 1. Ohm meter 100 will measure the resistance between point 100 and the closest grounded brush 62 providing an indication of relative displacement between the first and second assemblies 12 and 20.

The axial length of the second assembly 20, indicated in FIG. 1 as d, is dimensioned relative to the axial length of the coil assembly 16, indicated in FIG. 1 as D, so that D minus d represents the possible throw or stroke, i.e., displacement, of the actuator. Thus, a portion of the coil assembly 16 is always disposed between the inner core member 40 and the focus elements 48 and 50. A command signal can be provided to the coil assembly by applying the signal $V_c$ to the brush 60. Current will flow from brush 60 to each of the grounded brushes 58 and 62, since the latter are connected to system ground. Since the coil segments between brushes 60 and 58 and between brushes 60 and 62, have an equal resistance, an equal current will flow between brush 60 and brush 58 and between brush 60 and brush 62, although the current will flow through these sections of coil in opposite directions. However, the flux passing through these sections of coil will also be in opposite directions. The direction of the wire of the coil assembly, and therefore the current flowing through the coil wires, will always be parallel to the inner cylindrical surface 74 of each of the focussing elements 48 and 50 (and thus substantially perpendicular to the flux passing normally through those surfaces, as will be apparent hereinafter). Thus, in accordance with Lenz's Law, the force along axis 30 resulting from the current/flux product created by the flux from magnets 44, through the section of coil assembly 16 radially opposite the magnets, will be added to the force along axis 30 resulting from the current/flux product created by the flux from magnets 46.

Figure 4:
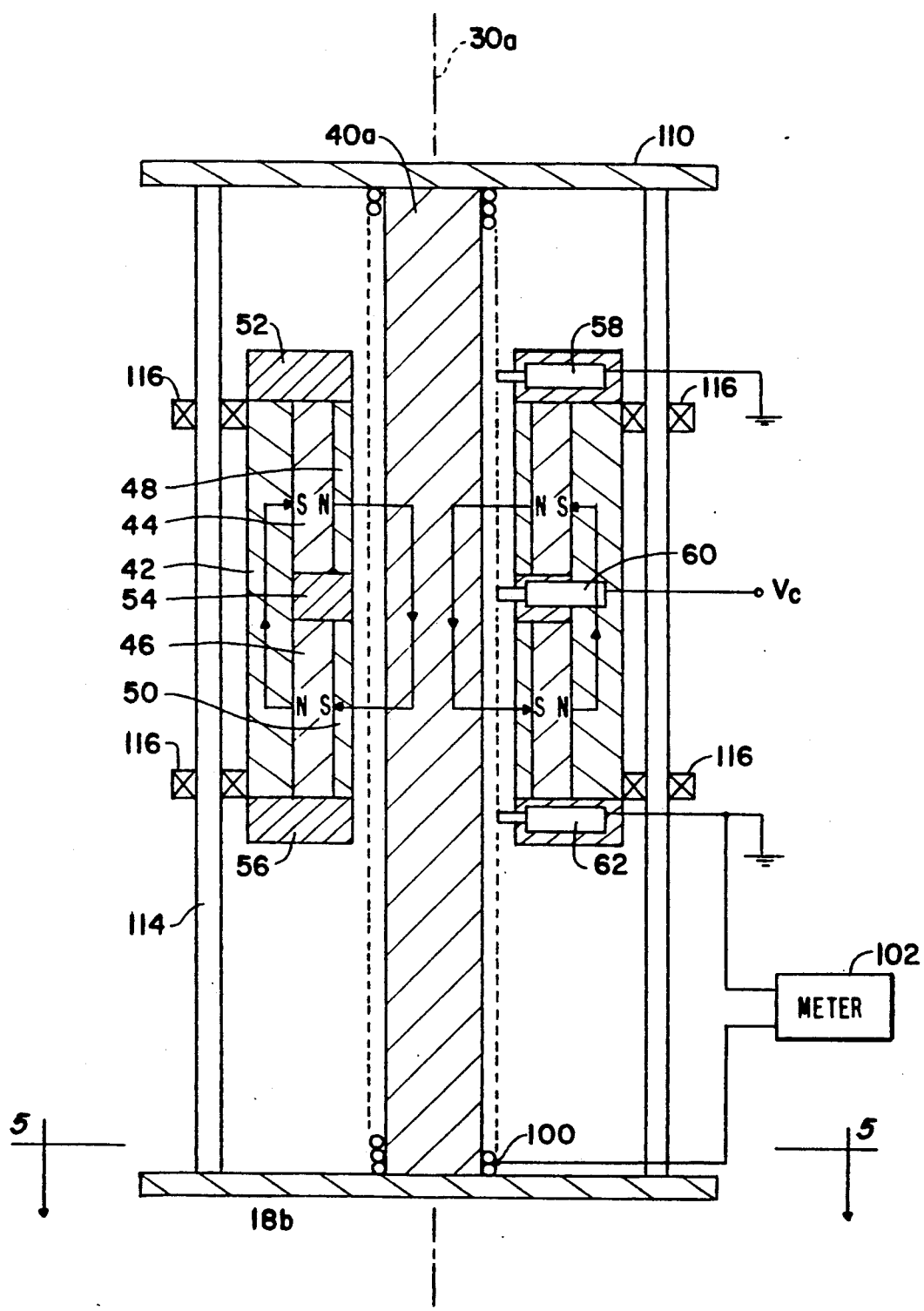
FIG. 4 is a cross-sectional view along the axis of relative movement of a second embodiment of the linear actuator of the present invention.
Figure 5:
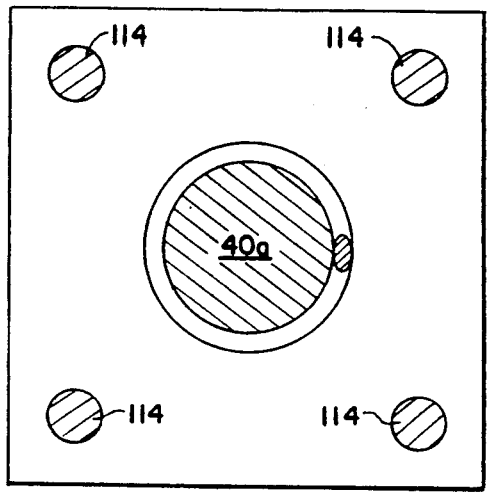
FIG. 5 is a cross-sectional view taken along line 5—5 in FIG. 4.
Figure 7:
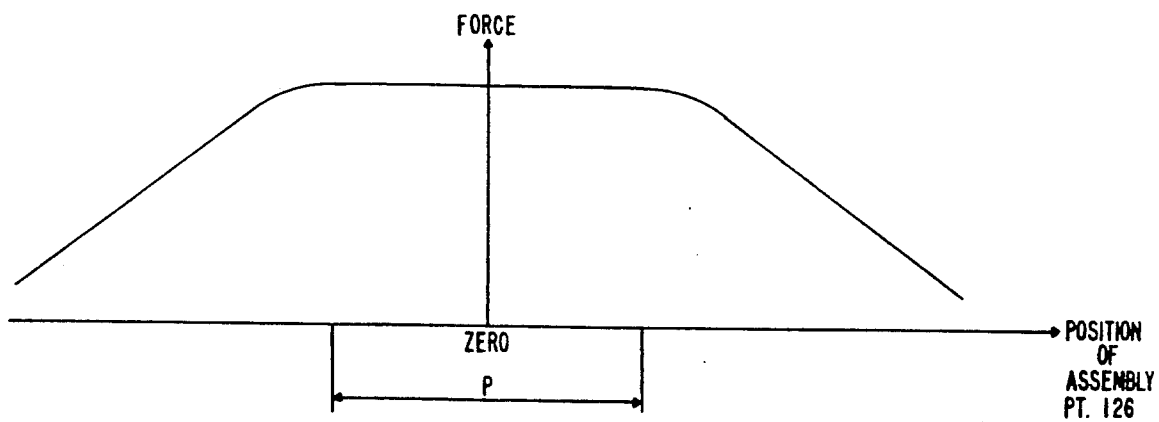
FIG. 7 is a graphical illustration of the relationship of the output force and relative position of the actuator assemblies of the embodiment shown in FIG. 6.

The embodiment shown in FIGS. 4 and 5 is substantially identical to the embodiment shown in FIGS. 1-3, except that the coil assembly 16a is wound onto and fixed to the inner core member 40a so that the first assembly 110 includes both the assembly 16a and core member 40a. Accordingly, this design is referred to as the "attached" coil design. Describing the attached coil design in greater detail, inner core member 40a is secured at opposite ends to the opposite end supports 18a and 18b. The core member, which is typically solid to minimize its diameter, is mounted coaxial with the axis 30. The coil assembly 16a is wound onto the core member 40a for substantially the entire length of the core member. The first assembly also includes at least two, but preferably three or more support rods 114 (four being shown in FIGS. 4 and 5) radially spaced from the coil assembly and oriented parallel to the axis 30, so as to create a cylindrical space in between the rods 114 and first assembly 110 for slidably receiving the second assembly 112. Alternatively, bushings can replace the rods 114, and used at opposite radial ends of the second assembly 112 for coupling the latter to the first assembly 110.

The second assembly 112 comprises the outer cylindrical case 42, the sets of magnets 44 and 46 focussing elements 48 and 50, brush holder rings 52, 54 and 56 and the brushes 58, 60 and 62, in an identical configuration as that shown in FIGS. 1-3. The second assembly is mounted on the support rods 114, by any suitable means, such as linear bearings 116, so that the second assembly 112 freely moves axialy along axis 30 relative to the first assembly 110 in response to a command signal $V_c$ applied to brush 60. Although not shown the second assembly can also include suitable supports for connecting the second assembly relative to the first assembly so that the force created between the two assemblies is transmitted to the appropriate structure with which the actuator is used. As in the embodiment of FIGS. 1-3, the total possible stroke of the actuator is D (the length of the coil assembly 16) minus d (the axial length of the second assembly). The attached coil design can also include the means for measuring the displacement of the first and second assemblies 12 and 20. More specifically, an ohmmeter 102 can be attached to point 100 and grounded brush 62 in order to measure the resistance between position 100 and grounded brush 62 so as to provide an indication of relative displacement between the two assemblies 110 and 112.

The free coil and attached coil designs each has its own advantages. The attached coil design is simpler to manufacture than the free coil embodiment due to the reduced number of parts and the elimination of the need of the coil assembly to be sufficiently structurally sound to support the forces generated by the actuator. Another major difference between the two designs which, depending on the application, may be an advantage or a disadvantage, is that the attached coil design demonstrates an increased "damping effect" caused by eddy-currents set up in the center core member 40a. Because the magnetic field moves relative to the iron core member, a force proportional to the relative velocity between the core member and the magnetic assembly is created that opposes the force creating the velocity. However, the advantage of the free coil design is that the actuator is of substantially less mass to move in response to created forces since the mass of the core member 16 of the free coil assembly is substantially smaller than the mass of the core member 40a of the attached coil assembly 16a. Thus, for applications where damping may be desirable to oppose external forces, such as the strut assembly described in the '328 Patent, the attached coil design may be preferable, while in applications where a quick response, with less damping is desired, the free coil design may be preferred.

Figure 6:
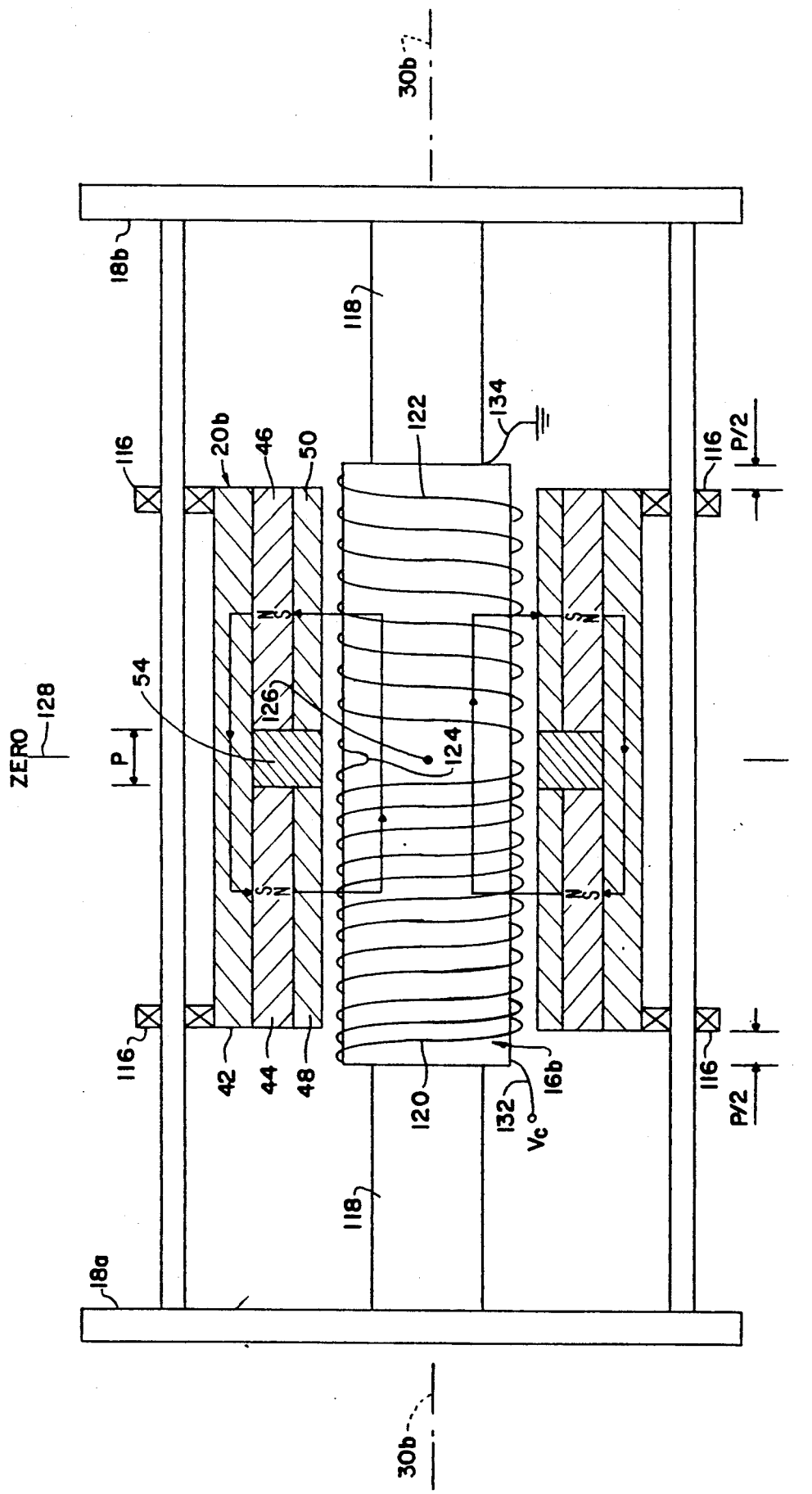
FIG. 6 is a view along the axis of relative movement of a third embodiment of the linear actuator of the present invention.

In addition in some applications where a brushless design is desirable, the embodiment shown in FIG. 6 may be used. As shown the brushless design is shown as a modification of the attached coil design of FIGS. 4 and 5. The actuator of FIG. 6 includes the inner core member 16b. The latter is secured between end supports 18a and 18b with suitable support links 118. The core member 16b has a neutral axial position in which a predetermined center reference point 126 of the core member is axialy positioned exactly between the two sets magnets 44 and 46 defined as the zero plane 128.

In the embodiment of FIG. 6 the coil assembly 16b is modified so as to include two coil segments 120 and 122, connected together at point 124 in the zero plane 128 when the core member is in the neutral axial position and wound onto the inner core member 16b in opposite directions about the common axis 30 from that connecting point 124. One coil segment 120 has one lead 132 extending from one end of the core member 16b and connected to receive the command signal $V_c$ while the other lead 134 extends from the other end of the core member 16b and connected to system ground. Alternatively, the command signal can be applied to the connecting point 124, with the ends of the coil sections connected to system ground. The coil segment 120 is wound on the core member 16b in one direction about the axis 30 from the connecting point 124 back toward the one end of the core member so that the coil assembly is entirely disposed within the flux path provided by the set of magnets 44 for any position of the core member 16b relative to the assembly 20b from the neutral axial position to a displacement of a distance p/2 (half the axial spacing between the set of magnets 44 and the set of magnets 46, as shown in FIG. 6) from the neutral axial position in either axial direction, for reasons which will be described hereinafter. The other coil segment 122 is wound on the core member 16b in the opposite direction about the axis 30 from the connecting point 124 back toward the other end of the core member so that the coil assembly is entirely disposed within the flux path provided by the set of magnets 46 for any position of the core member 16b relative to the assembly 20b from the neutral axial position in either axial direction. It should be appreciated that since the embodiment shown in FIG. 6 is a brushless design, the thickness of each of the coil segments 120 and 122 can comprise a plurality of layers of coil wire so as to increase the number of turns exposed to each magnetic field.

As shown in FIG. 6, the design has a limited throw, where the maximum force is provided when the core member is precisely positioned so that the center reference point 126 is disposed in the zero plane 128. Thus, with the spacing between the magnets 44 and 46 defined as "p" (as shown in FIG. 5), the force (indicated along the vertical axis) will be constant so long as the center reference point 126 (indicated along the horizontal axis) is disposed within the limits defined by "p". Should the center reference point move axialy beyond the limits set by "p", the force begins to drop off as indicated.

Figure 8:
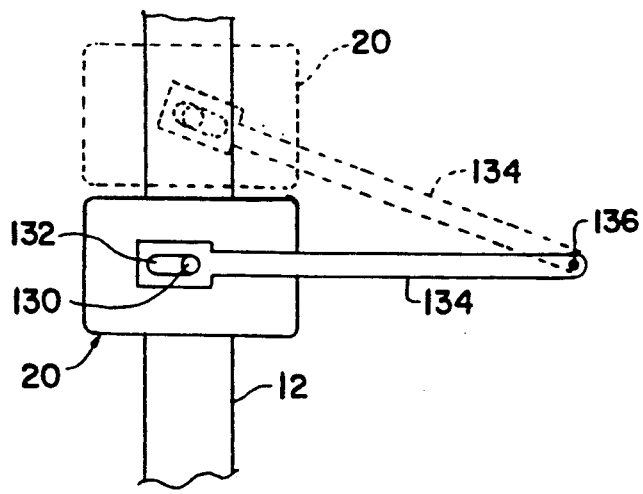
FIG. 8 shows one embodiment of an angular actuator incorporating one or more aspects of the present invention.
Figure 9:
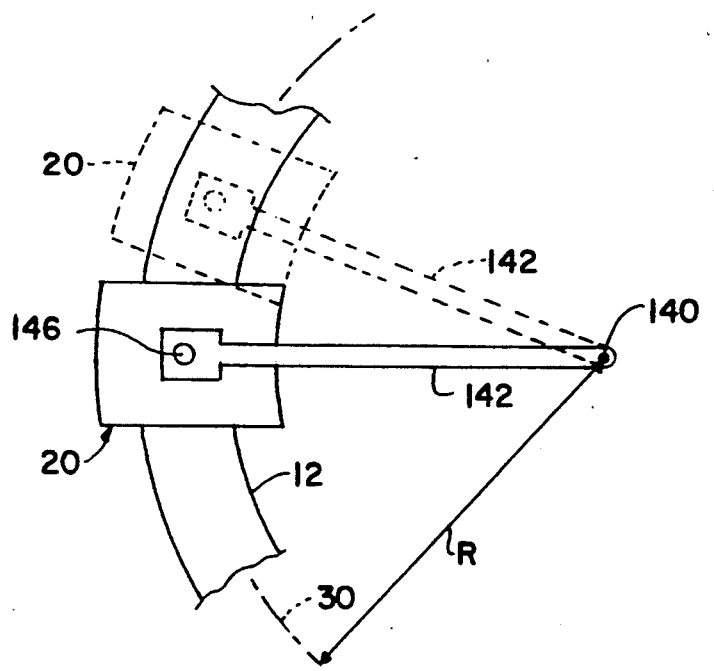
FIG. 9 shows a second embodiment of an angular actuator incorporating one or more aspects of the present invention.

It should be appreciated that while the linear actuators described with reference to FIGS. 1-6 are designed to provide linear output forces, each actuator can be designed to provide a torque or angular displacement as in the case of an angular actuator. As shown in FIGS. 8 and 9, the linear actuator of any one of the three designs shown in FIGS. 1-6 can be suitably connected to linkage to convert the linear motion to angular motion. In FIG. 8, this is accomplished by fixing one of the first and second assemblies (shown as the first assembly 12) against linear movement, and connecting the other assembly (shown as the second assembly 20) to a pin 130. The pin extends through the radial slot 132 of link 134. Link 134 is pivotally supported at point 136 spaced from radial slot 132 so that as the second assembly moves relative to the first assembly the link will pivot about the pivot point 136, with the pin 130 moving in the slot 132 to accommodate the pivoting motion.

Alternatively, as shown in FIG. 9, the first and second assemblies could be formed identically to any one of the actuators described with reference to FIGS. 1-6, except that the axis of relative movement 30, and all of the parts of the actuator are designed to curve about a center of curvature 140 at a radial distance R. The angular actuator can easily be used for example to rotate a lever arm 142 about an axis through center 140 normal to the plane of FIG. 9, by fixing the arm so that it can pivot about a pin at the center of curvature 140, and attaching the arm to one of the assemblies (shown in FIG. 9 as the second assembly 20) with pivot pin 146. The second assembly is then fixed to a base support. The command signal can then be used to control the amount of relative movement of the first and second assemblies along the axis of relative movement 30. In the angular actuator version, meter 100 can be used to measure relative angular displacement or angular throw.

The electromagnetic actuator of the present invention provides certain improvements over the actuator design shown and described in the '343 Patent, while benefiting from the advantages of the invention described and claimed therein. The present actuator is greatly simplified and is adapted to use flat magnets, making it substantially cheaper to manufacture. The magnets are further protected so as to improve the life of the magnets. By providing the attached coil design shown in FIG. 4, the actuator provides an inherent damping of a system. The brushless design shown in FIG. 6 provides an actuator having increased life, although the actuator travel is more limited. Finally, the actuator designs shown in FIGS. 1-6 can easily be modified to provide angular actuators as shown in FIGS. 8 and 9.

Since certain changes may be made in the above product without departing from the scope of the invention herein involved, it is intended that all matter contained in the above description or shown in the accompanying drawing shall be interpreted in an illustrative and not in a limiting sense.

What is claimed is:

1. In an electromagnetic actuator of the type comprising (a) a first assembly; (b) a second assembly movable relative to the first assembly along an axis of relative movement in response to a command signal, the second assembly comprising magnetic flux source means for defining radially directed flux both in an inward and outward direction relative to the axis of relative movement; (c) coil assembly means for defining at least two coil segments respectively disposed in the paths of the flux in the inward and outward directions; and (d) means for applying the signal to the coil segments so that a current flows in one direction around the axis through the inward directed flux, and flows in the opposite direction around the axis through the outward directed flux so that the flux/current force applied between the first and second assemblies is additive, the improvement comprising:

the magnetic flux source means includes a plurality of flat magnets, radially spaced around the axis, for providing a source of flux, and means for focusing the flux provided by the magnets so as to orient the flux in substantially radial directions through the coil sections.

2. An electromagnetic actuator according to claim 1, wherein the magnetic flux source means further includes means for focusing the flux through the coil segments so that the flux is substantially normal to the coil.

3. An electromagnetic actuator according to claim 1, further including means for sealing the magnets in place and from the environment so as to protect the magnets.

4. An electromagnetic actuator according to claim 1, further including means for measuring the relative displacement between the first and second assembly.

5. An electromagnetic actuator according to claim 1, wherein the coil assembly forms part of the first assembly so that the magnetic flux source means moves relative to the coil assembly as the first and second assemblies move relative to one another.

6. An electromagnetic actuator according to claim 5, wherein the second assembly includes a core member of magnetically conductive material positioned within the coil and adapted to move with the magnetic flux source means relative to the coil assembly.

7. An electromagnetic actuator according to claim 5, wherein the first assembly includes a core member of magnetically conductive material positioned with and fixed relative to the coil so that the coil and core member are movable relative to the magnetic flux source means.

8. An electromagnetic actuator according to claim 1, wherein said means for applying the command signal includes brushes supported by said second assembly and in electrical contact with said coil sections.

9. An electromagnetic actuator according to claim 1, wherein the two coil sections are wound opposite to one another about said axis and said means for applying the command signal includes means for applying said command signal directly to said coil segments so that said actuator is brushless.

10. In an electromagnetic actuator of the type comprising (a) a first assembly; (b) a second assembly movable relative to the first assembly along an axis of relative movement in response to a command signal, the second assembly comprising magnetic flux source means for defining radially directed flux both in an inward and outward direction relative to the axis of relative movement; (c) coil assembly means for defining at least two coil segments respectively disposed in the paths of the flux in the inward and outward directions; and (d) means for applying the command signal to the coil segments so that a current flows in one direction around the axis through the inward directed flux, and flows in the opposite direction around the axis through the outward directed flux so that the flux/current force applied between the first and second assemblies is additive, the improvement comprising:

said first assembly includes a core member and said coil segments are wound onto said core member.

11. In an electromagnetic actuator of the type comprising (a) a first assembly; (b) a second assembly movable relative to the first assembly along an axis of relative movement in response to a command signal, the second assembly comprising magnetic flux source means for defining radially directed flux both in an inward and outward direction relative to the axis of relative movement; (c) coil assembly means for defining at least two coil segments respectively disposed in the paths of the flux in the inward and outward directions; and (d) means for applying the command signal to the coil segments so that a current flows in one direction around the axis through the inward directed flux, and flows in the opposite direction around the axis through the outward directed flux so that the flux/current force applied between the first and second assemblies is additive, the improvement comprising:

the coil assembly means includes at least two coil segments wound in opposite directions about the axis and means connected to said coil assembly for applying the command signal so that the actuator is brushless.

* * * * *